United States Patent [19]

Inman et al.

[11] 3,723,490

[45] Mar. 27, 1973

[54] PRODUCTION OF AZOMETHINE PIGMENTS

[75] Inventors: Eric Richard Inman, Bridge of Weir/Renfrewshire; Ian Alexander Macpherson, Paisley, Renfrewshire; John Andrew Stirling, Glasgow, all of Scotland

[73] Assignee: Ciba-Geigy A G, Basel, Switzerland

[22] Filed: May 20, 1970

[21] Appl. No.: 39,164

[52] U.S. Cl............260/438.1, 106/288 Q, 106/309, 241/16, 241/18, 241/22, 241/30, 260/41
[51] Int. Cl. .......................................C07f 1/08
[58] Field of Search........260/438.1; 106/309, 288 Q; 241/16, 18, 22, 30

[56] References Cited

UNITED STATES PATENTS

| | | | |
|---|---|---|---|
| 2,116,913 | 5/1938 | Schmidt et al. | 260/438.1 X |
| 2,442,200 | 5/1948 | Downing et al. | 260/438.1 X |
| 3,440,254 | 4/1969 | Lenoir | 260/438.1 X |
| 2,239,290 | 4/1941 | Krzikalla et al. | 260/438.1 X |
| 2,282,936 | 5/1942 | Chenicek | 260/438.1 X |
| 2,381,952 | 8/1945 | Gubelmann | 260/438.1 X |

FOREIGN PATENTS OR APPLICATIONS

| | | | |
|---|---|---|---|
| 1,122,938 | 8/1968 | Great Britain | 106/288 Q |
| 1,123,859 | 8/1968 | Great Britain | 106/288 Q |

OTHER PUBLICATIONS

Ginsberg et al., J. Inorg. Nucl. Chem., Vol. 29, pp. 353–365 (1967).

Primary Examiner—H. Sneed
Attorney—Wenderoth, Lind & Ponack

[57] ABSTRACT

Copper complexes of substituted bis-2-hydroxyphenyl-azomethines are prepared by reacting the products of salicylaldehydes and o-aminophenols with a coppering agent. Said compounds are pigments for organic material.

4 Claims, No Drawings

PRODUCTION OF AZOMETHINE PIGMENTS

DETAILED DESCRIPTION

The present invention relates to organic compounds, and in particular to substituted azomethine compounds having valuable pigmentary properties. The present invention relates in particular to azomethine coloring matters suitable for the pigmentation of paints, lacquers, printing inks, rubber, artificial polymeric materials, paper and textile materials, and to processes of producing these azomethine substances.

It is known from U.S. Pat. No. 2,116,913 that an olive azomethine dye may be obtained by reaction of ortho-hydroxybenzaldehyde with ortho-aminophenol and copper acetate. This dye may be converted into a form in which it can be used in the pigment industry by certain conditioning methods, for instance by grinding with salt followed by treating with solvent, but the resulting pigment has inferior properties, in particular lacking color strength and acid stability. In British Pat. specification No. 1,122,938 there is described the introduction of a phenyl substituent at a specified position in the 2-amino-phenol moiety of the azomethine molecule, with some evident increase in color strength.

The present invention provides further substituted azomethine compounds having improved pigmentary properties in particular having superior strength, dispersibility and acid resistance.

According to the present invention, there is provided a substituted azomethine compound having the formula:

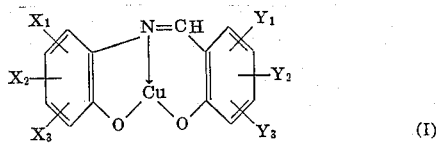

(I)

wherein $X_1$, $X_2$ and $X_3$ represent hydrogen, halogen or nitro, unsubstituted carbamoyl, carbamoyl substituted by phenyl, unsubstituted sulfamoyl, sulfamoyl substituted by alkyl having from one to four carbon atoms or alkylamino wherein each alkyl has from one to four carbon atoms and $Y_1$, $Y_2$ and $Y_3$ represent hydrogen, halogen, alkoxy having one to four carbon atoms, nitro, unsubstituted phenylazo, or phenylazo substituted by nitro or alkyl having from one to four carbon atoms, with the proviso that at least one of the groups $X_1$, $X_2$, $X_3$, $Y_1$, $Y_2$ and $Y_3$ is different from hydrogen.

If the substitution represented by $X_1$, $X_2$, $X_3$, $Y_1$, $Y_2$ and/or $Y_3$ comprises halogen, the halogen is preferably chlorine or bromine. If the substitution represented by $Y_1$, $Y_2$ and/or $Y_3$ comprises alkoxy groups, each preferably has a methyl moiety. If the substitution represented by $X_1$, $X_2$ and/or $X_3$ comprises alkylsulphonamido groups, each alkyl moiety of the substitution is a straight- or branched-chain alkyl group.

The present invention also provides a process of producing a compound of formula I which comprises reacting a Schiff's base having the formula:

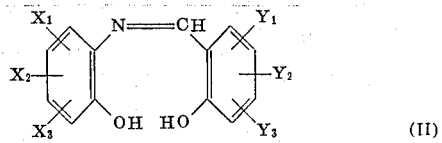

(II)

with a coppering agent, wherein the symbols have their previous significance.

The coppering agent may be a conventional agent used in the production of copperized compounds, and is conveniently a solution of a cupric salt, for example copper (II) acetate. The reaction may be carried out under a wide variety of reaction conditions, but conveniently the Schiff's base of formula II is heated with the coppering agent at a temperature within the range of from ambient to 150° C., an elevated temperature within the range of from 80° to 100° C. being particularly preferred. The reaction may be carried out in an organic solvent which is at least substantially inert under the conditions of the reaction, for instance formamide, dimethyl formamide, N-methylpyrrolidine, glycol monoethyl ether, isobutanol or glacial acetic acid. Conveniently the solvent used is the same solvent as is used to form a solution of the cupric salt used as the coppering agent.

If desired, the Schiff's base of formula II may be prepared during the course of the process by the reaction of an ortho-hydroxy-aldehyde having the formula:

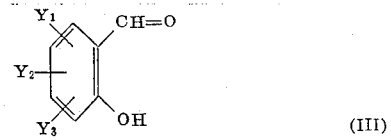

(III)

with an ortho-aminophenol having the formula:

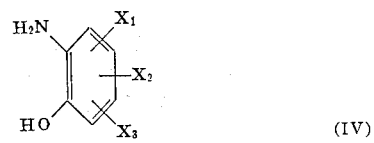

(IV)

wherein the symbols have their previous significance. Examples of ortho-aminophenols which may be used to produce products of especial value as pigments are 4-nitro-2-amino-phenol, 4chloro-2-aminophenol, 3-amino-4-hydroxy-benzanilide and 4-chloro-5-nitro-2-aminophenol.

As a further variation of the process of the present invention, the desired azomethine compound of formula I may be produced under aqueous conditions in the absence of an organic solvent by reacting an alkaline solution of an ortho-aminophenol of formula IV with an alkaline suspension or solution of an aldehyde of formula III, acidifying the resultant product (for example with acetic acid) and adding the coppering agent to the suspension of the corresponding Schiff's base of formula II so formed. If desired, the azomethine suspension may be filtered, the azomethine paste washed and then resuspended before the addition of the coppering agent. The coppering agent may be aqueous cupric sulphate solution containing sufficient sodium acetate present in solution to maintain the pH value above 3. Alternatively a solution of a cuprammonium salt may be used. Surface active agents may also be used if desired. By this variation of the process of the invention colored products may be obtained in a finely divided form which are usable directly as pigments.

The present invention also provides a second process of producing a compound of formula I which comprises reacting an azomethine derivative having the formula:

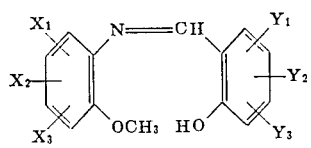

wherein the symbols have their previous significance with at least one molecular equivalent proportion of a coppering agent.

The process is conveniently effected in the presence of an organic solvent which is substantially inert under the conditions of the reaction, for instance dimethylformamide. As this second process of the invention entails the splitting of the ether linkage, a higher reaction temperature is in general required than in the first process of the invention. The preferred reaction temperature is within the range of from 140° to 180° C.

The compounds of formula I have valuable pigmentary properties and may, if desired, be brought into pigmentary form by conventional conditioning methods.

The pigments are distinguished by their high color strength, high resistance to solvents, outstandingly good light fastness in lacquer printing and intaglio printing, outstanding good fastness to overlacquering, and especially by their excellent resistance to weathering.

Accordingly, the present invention also provides a process of producing a pigment which comprises conditioning a substituted azomethine compound of formula I. The present invention also comprises pigments so produced, and organic materials colored by the pigments of the invention.

The desired azomethine compound of formula I need not be pre-formed before the conditioning is carried out; it may be prepared during the course of the conditioning procedure. For example, the desired azomethine compound of formula I may be produced by reacting together an ortho-aminophenol of formula IV with an aldehyde of formula III and then a coppering agent while conditioning is carried out simultaneously for instance in a horizontally rotating gravity grinder (for example, a ball-mill), a grinder operated by a vertically rotating shaft, especially a sand grinder, or in a grinder operated by vibratory action or by any other comminution method compatible with the presence of the chemical reactants. In this type of conditioning a water soluble copper salt such as cupric sulphate, conveniently in the hydrated form, is particularly suitable as the coppering agent, especially in the presence of an acid buffer such as sodium acetate. If desired, a surface active agent may also be used in these conditioning techniques.

Known conditioning techniques may be used, for example, grinding with calcium chloride, sodium chloride or other organic or inorganic salt, with or without the addition of dimethylaniline, xylene or other organic solvent; or heating with a high-boiling organic solvent, for instance, nitrobenzene or α-chloronaphthalene. The compounds of formula I may also be dispersed in water if desired, for example, by means of pebble milling in the presence of a dispersing agent which may be of the anionic, cationic or non-ionic type.

The pigments produced in accordance with this invention may be of a shade ranging from greenish yellow to brown depending on the nature of the substituted azomethine molecule and on the conditioning technique employed. The pigments of this invention are suitable for use in the pigmentation, by known methods, of high molecular weight hydrophobic organic material, for instance paints, lacquers, printing inks, rubber, synethic polymeric materials, paper and textile materials. In general, pigments of this invention exhibit good fastness properties, especially to light, heat, cross-lacquering and migration, and resistance to organic solvents, such as trichloroethylene, toluene and methyl ethyl ketone.

The present invention also comprises the coloration of an organic material with a substituted azomethine compound of formula I, together with organic materials when so colored.

The coloration may be carried out, for example, by preparing the substituted azomethine compound in a finely divided state and incorporating it into the organic material in a conventional manner.

The high molecular weight hydrophobic organic material or other organic material to be colored according to the invention may be any polymeric or other organic material capable of being pigmented or otherwise colored. The material may be, a natural or synthetic polymer or co-polymer, a coating composition for application to the surface of an article, or a printing liquid medium. However, the process of the invention is applicable with particular advantage to the pigmentation of natural or synthetic polymers or co-polymers, in the form of fibers, films or bulk material; to paints; lacquers and other surface coating compositions, or to tinting compositions for use in preparing such coating compositions; and to printing inks. Examples of polymers or co-polymers which may be pigmented by the process are vinyl chloride or acrylonitril polymers and co-polymers; polyethylene, polypropylene and other polyolefines; polystyrene and polystyrene co-polymers; and natural and synthetic rubbers.

The present invention is further illustrated by the following examples. Parts and percentages shown therein are expressed by weight.

EXAMPLE I

Forty-seven parts of 5-chlorosalicylaldehyde and 32.7 parts of 2-aminophenol were heated to boiling in 50 parts of 2-methoxyethanol. After cooling the orange crystals (m.p. 189°–90° C) were filtered off. 24.7 parts of this orange material, dissolved in 25 parts of dimethylformamide, was treated with 20 parts of cupric acetate, dissolved in 45 parts of dimethylformamide, and the mixture refluxed for 1½ hours. The resulting greenish yellow solid was filtered off, washed with dimethylformamide, methanol and dried at 60° C.

This product was ball-milled with nine times its weight of a mixture of sodium acetate and sodium sulphate. The resulting pigment was isolated by washing with water giving a fine greenish yellow powder.

The product has the formula:

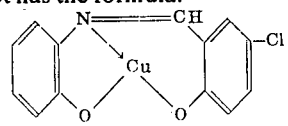

EXAMPLE 2

4.18 parts of 4-nitro salicylaldehyde and 2.73 parts of 2-amino-phenol were heated to boiling in 150 parts 2-methoxy ethanol. After 30 minutes at the boil the mixture was cooled and treated with 5.0 parts of cupric acetate monohydrate dissolved in 50 parts of dimethylformamide. The resultant mixture was heated to the boil and held at that temperature for 15 minutes then filtered hot, and the green-yellow product obtained (m.pt. over 360° C) washed with dimethylformamide and ethanol and dried at 60° C.

The product was conditioned as in Example 1 and had the formula:

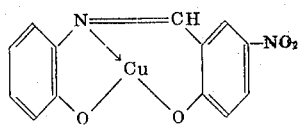

By substituting an equivalent amount of the appropriate aminophenol for the 2-aminophenol in Examples 1 or 2 and an equivalent amount of the appropriate hydroxyaldehyde for the 5-chloro-salicylaldehyde used in Example 1, or the 5-nitro-salicylaldehyde used in Example 2, the products in the following table were obtained. The table also gives the color in lacquer and a summary of the fastness properties of the pigments.

EXAMPLE 10

50.4 parts of 2-amino-4-nitro anisole and 36.6 parts of salicylaldehyde were heated to boiling in 250 parts of 2-methoxy ethanol. After cooling, orange crystals were filtered off, washed with methanol and dried at 60° C. 5.44 parts of these crystals dissolved in 50 parts of 2-methoxy ethanol were treated with 4.0 parts of cupric acetate monohydrate dissolved in 50 parts of dimethyl-formamide and the mixture refluxed for 2 hours. A green-yellow product (m.pt. over 360° C) was filtered off, washed with dimethylformamide and ethanol and dried at 60° C.

The product was conditioned as in Example 1 and had the formula:

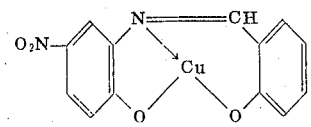

EXAMPLE 11

12.2 parts of salicylaldehyde, 16.6 parts of 2-amino-4-amido-anisole and 193 parts of 2-methoxy-ethanol

| Example | Aminophenol | Aldehyde | Product | Colour in lacquer | Stability |
|---|---|---|---|---|---|
| 3 | C₆H₅NHCO-⬡-NH₂, -OH | ⬡-CHO, -OH | C₆H₅NHCO-⬡-N=CH-⬡ (Cu complex) | Greenish yellow. | Excellent. |
| 4 | Cl-⬡-NH₂, -OH, Cl, Cl | Same as above | Cl,Cl-⬡-N=CH-⬡ (Cu complex), Cl | do | Very good. |
| 5 | ⬡-NH₂, -OH | CH₃-⬡-NO₂, N=N-⬡-CHO, -OH | ⬡-N=CH-⬡-N=N-⬡-CH₃, O₂N (Cu complex) | Brownish yellow. | Good. |
| 6 | O₂N-⬡-NH₂, -OH, NH(CH₂)₃CH₃ | ⬡-CHO, -OH | O₂N-⬡-N=CH-⬡ (Cu complex), CH₃(CH₂)₃HN | Greenish yellow. | Excellent. |
| 7 | H₂N-SO₂-⬡-NH₂, -OH | Same as above | H₂N-SO₂-⬡-N=CH-⬡ (Cu complex) | do | Do. |
| 8 | ⬡-NH₂, -OH | ⬡-CHO, -OH, OCH₃ | ⬡-N=CH-⬡ (Cu complex), OCH₃ | do | Do. |
| 9 | Same as above | O₂N-⬡-CHO, -OH | ⬡-N=CH-⬡-NO₂ (Cu complex) | Yellow | Do. | were treated under reflux for 30 minutes before the addition of a hot solution of 20 parts of cupric acetate monohydrate in 190 parts of dimethylformamide and reflux with stirring continued for 5 hours. A product was filtered off, as green crystals (m.pt. above 360° C) washed with dimethylformamide, followed by ethanol and dried. This product was ball-milled with nine times its weight of a mixture of sodium acetate and sodium sulphate. The resulting pigment was isolated by washing with water giving a fine greenish-yellow powder.

The product had the formula:

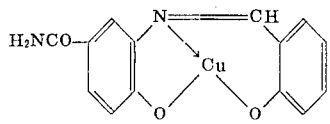

By substituting an equivalent amount of the appropriate anisole in Examples 10 or 11, the products in the following table were obtained,. The table also gives the color in lacquer and a summary of the fastness properties of the pigments.

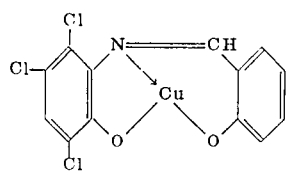

EXAMPLE 16

15.2 parts of 2-hydroxy-3-methoxy benzaldehyde were dissolved in a solution of 4.0 parts sodium hydroxide and 150 parts water at 40° C and the mixture allowed to cool to room temperature. To the resulting solution was added a solution of 10,9 parts of 2-aminophenol and 4.0 parts of sodium hydroxide in 150 parts water at 50° C. After stirring for 5 minutes, 24 parts of a 50 percent solution of acetic acid were added giving a pH of between 5 and 6. The resulting orange suspension was heated to 80° C and a solution of 25.2 parts of copper sulphate pentahydrate in 300 parts water added over 15 minutes at 80°–90°C. The temperature was held at 80°–90°C for 2 hours. The resultant greenish yellow mixture was filtered hot, and the product obtained was washed with hot water and dried at 60° C, giving 29.5 parts of greenish yellow powder having a melting point above 360° C. The product had the formula:

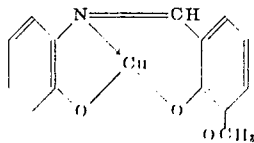

EXAMPLE 17

A mixture of 15.2 parts of 2-hydroxy-3-methoxy benzaldehyde, 10.4 parts of 2-aminophenol, and 200 parts of ceramic balls (half-inch diameter) was placed in a pot-mill and ground for 24 hours. To the ground mixture was added 27.2 parts of sodium acetate trihydrate, and 26 parts sulphate pentahydrate both as solids, and 100 parts water. Grinding was then con-

| Example | Aminoanisole | Product | Colour in lacquer | Stability |
|---|---|---|---|---|
| 12 | (C₂H₅)₂NSO₂–⌬–NH₂, OCH₃ | (C₂H₅)₂NSO₂–⌬–N=CH–⌬, Cu, O, O | Greenish-yellow | Good. |
| 13 | Br–⌬(Br,Br)–NH₂, OCH₃ | Br–⌬(Br,Br)–N=CH–⌬, Cu, O, O | Yellow | Do. |
| 14 | Br–⌬–NH₂, OCH₃ | Br–⌬–N=CH–⌬, Cu, O, O | Greensih-yellow | Do. |

EXAMPLE 15

21.2 parts of 2-amino-3,4,6-trichlorophenol, 12.2 parts of salicylaldehyde and 150 parts of water were stirred for 10 minutes before the addition of 4.2 parts of sodium hydroxide dissolved in 50 parts of water followed by 15.6 parts of sodium bisulphite. The slurry was heated to 90° C for 15 minutes and a light brown product filtered off, and washed with 500 parts of cold water. The azomethine paste thus obtained was then reslurried in 250 parts of cold water using high speed shear agitation for 15 minutes before the addition of a solution of cuprammonium sulphate prepared by dissolving 27.5 parts hydrated copper sulphate in 100 parts of water and adding 53 parts of concentrated ammonium hydroxide solution to dissolve the initial precipitate. The slurry was heated to 95° C for 60 minutes, and then filtered hot; the product obtained was washed with hot water and dried giving 29.2 parts of a red-brown powder which did not melt below 360° C.

The product had the formula:

tinued for a further 90 hours. The ceramic balls were then separated off by a coarse mesh sieve and the remainder of the mixture filtered, and the product washed with water and dried at 60° C. The resulting pigment was a greenish yellow powder having a melting point above 360° C.

The product had the formula:

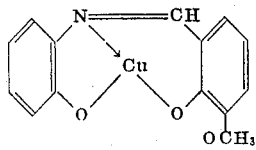

EXAMPLE 18

The dihydroxy azomethine copper II complex prepared in Example 1, together with a variety of other dihydroxy azomethine copper II complexes were incorporated into stoving lacquers.

In each case, a paste was formulated consisting of 1 part of the pigment and 3 parts of "Uresine B" (a commercial carbamate resin). The medium in each case was prepared by mixing 50 parts of a 60 percent solution "Beckosol 3246" (a coconut glycol alkyd resin of the non-drying type) in xylene, 30 parts of 2-methoxyethanol. The lacquers were then prepared in the conventional manner and a film of each sample was applied to cardboard. The stoving time was 30 minutes at 120°C.

The pigmentations made were: a 3 percent mixture comprising 0.3 parts of the pigment in 10 parts of the total mixture and a tint shade reduced 1:100 with titanium dioxide. The overlacquering fastness was measured by overlacquering the film on cardboard with white lacquer containing 20 percent titanium dioxide and re-stoving at 120° C for 30 minutes. The resultant staining of the white film was then assessed. Heat stability was assessed after re-stoving samples of the lacquer films at 120° C. for 30 minutes and at 180° C for 15 minutes. The lightfastness was assessed after exposure to a xenon arc lamp by comparison with the Blue Wool Scale BS. 1006 (1961). The lightfastness, heat stability and overlacquering fastness were all found to be excellent.

EXAMPLE 19

The dihydroxy azomethine copper II complex prepared in Example 16 was incorporated into an emulsion paint.

A paste was formed consisting of 20 parts of the pigment, 80 parts of water and 2.5 parts of the sodium dinaphthylmethane disulphonate sold under the Trade Mark Belloid SFD and milled for 48 hours with 60 parts of coarse quartz sand. The sand was removed by sieving. 0.3 parts of this paste were mixed with 30 parts of a polyvinylacetate emulsion and stirred until a homogeneous mixture was obtained, and a film of the sample was applied to cardboard. A bright yellow pigmentation with excellent properties was obtained.

EXAMPLE 20

Fifteen parts of the product of Example 6 were stirred into 500 parts of dimethylformamide until a smooth dispersion was obtained. This dispersion was diluted with 8000 parts of dimethylformamide. To this suspension were added 1500 parts of polyacrylonitrile powder and the mixture stirred at high speed until a smooth dope had been obtained. After deaeration the dope was suitable for the preparation of films and filaments since the pigment was present in a highly dispersed form, no large particles being visible. Films of 20 thousands of an inch thickness were drawn on glass and dried immediately at 120° C and 15 minutes. Bright, strong, transparent yellow films which had excellent fastness to light were thus obtained.

EXAMPLE 21

Various of the copper complexes of the invention were prepared in a finely divided state by milling with anhydrous sodium acetate and sodium sulphate in the presence of xylene. The product of Example 16 when prepared in a finely divided state as described above was suitable for incorporation into polyvinylchloride films of the following formulation:

100 parts of "Geon 121" polyvinylchloride
60 parts of dialphenylphthalate
3 parts of Advastab BC 247 (Ba/Ca salt of long chain fatty acid)
1 part of Advaplast 37 (epoxy soya bean oil condensate)
(Geon Advastab and Advoplast are registered Trade Marks. The dialphenylphthalate is the diester from phthalic acid and the commercially available mixture of alcohols known as "Alphanol.")

Two pigmentations were made, one as a full-shade pigmentation using 1 percent based on the polyvinylchloride content of the formulation, the other being a shade reduction pigmentation using 0.1 percent of the pigment together with 1 percent of titanium dioxide, both percentages being based on the polyvinylchloride content of the formulation. The films were prepared and cured in the conventional way, the normal film thickness in each case being 1/50th of an inch and curing being carried out at 170° C for 15 minutes.

There resulted strong bright yellow films the full-shade being especially highly transparent. These films exhibited very high fastness properties for instance to light and to migration.

What we claim is:

1. A process for the production of a compound of the formula

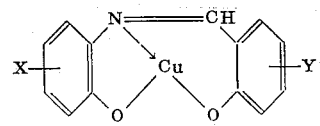

wherein X represents from one to three substituent groups which are the same or different and each is hydrogen, halogen, nitro, amido, phenylcarbamoyl, sulphamoyl, $C_1-C_4$ alkylsulphonamido, $C_1-C_4$ alkylamino or $C_1-C_4$ alkyl and Y represents from one to three substituent groups which are the same or different and each is halogen, $C_1-C_4$ alkoxy, nitro or phenylazo, or hydrogen where X is not also hydrogen, which comprises reacting an azomethine compound of the formula

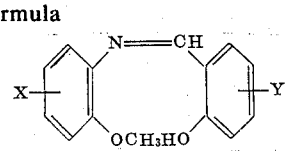

wherein X and Y are each as defined above, with at least one molecular equivalent proportion of a coppering agent.

2. A process for producing a pigment comprising finely dividing a compound of the formula

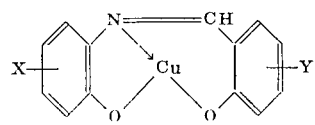

wherein X represents from one to three substituent groups which are the same or different and each is hydrogen, halogen, nitro, amido, phenylcarbamoyl, sulphamoyl, $C_1$–$C_4$ alkylsulphonamido, $C_1$–$C_4$ alkylamino or $C_1$–$C_4$ alkyl and Y represents from one to three substituent groups which are the same or different and each is halogen, $C_1$–$C_4$ alkoxy, nitro or phenylozo, or hydrogen where X is not also hydrogen.

3. A process as claimed in claim 2 wherein the compound is produced by reacting an ortho-hydroxy aldehyde of the formula

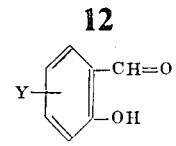

wherein Y is as defined in claim 2, with ortho-aminophenol of the formula

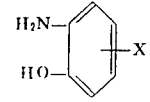

wherein X is as defined in claim 2, and then a coppering agent, while the fine division is carried out simultaneously.

4. A process as claimed in claim 2 wherein the fine division is effected in a horizontally rotating gravity mixer, a grinder operated by a vertically rotating shaft or a grinder operated by vibratory action.

* * * * *

UNITED STATES PATENT OFFICE
CERTIFICATE OF CORRECTION

Patent No. 3,723,490      Dated March 27 1973

Inventor(s) Eric Richard INMAN, Ian Alexander MACPHERSON and John Andrew STIRLING It is certified that error appears in the above-identified patent and that said Letters Patent are hereby corrected as shown below:

Insert in the Heading of the Patent, after the Serial No.,

--Claims priority, application Great Britain, May 23, 1969, 26503/69--.

Signed and sealed this 9th day of April 1974.

(SEAL)
Attest:

EDWARD M. FLETCHER, JR.
Attesting Officer

C. MARSHALL DANN
Commissioner of Patents